United States Patent [19]

Arghiropoulos et al.

[11] 4,124,500
[45] Nov. 7, 1978

[54] PROCESS FOR THE SEQUESTRATION OF OXYGEN DISSOLVED IN WATER AND COMPOSITIONS USEFUL FOR SUCH PURPOSE

[75] Inventors: Basile Arghiropoulos, Cavern; Adrien P. N. Tignol, Montrejeau, both of France

[73] Assignee: Produits Chimiques Ugine Kuhlmann, Paris, France

[21] Appl. No.: 808,417

[22] Filed: Jun. 20, 1977

Related U.S. Application Data

[63] Continuation of Ser. No. 647,675, Jan. 9, 1976, abandoned.

[30] Foreign Application Priority Data

Jan. 20, 1975 [FR] France .................. 75 01607

[51] Int. Cl.² .............................................. C02B 1/18
[52] U.S. Cl. ...................... 210/59; 252/188; 252/392; 252/393; 423/269; 423/407; 422/16
[58] Field of Search .................. 21/2.7 R; 210/54, 58, 210/59; 252/8.55 E, 390, 392, 393, 188; 423/269, 407

[56] References Cited

U.S. PATENT DOCUMENTS

| | | | |
|---|---|---|---|
| 2,029,960 | 2/1936 | Urbain | 210/59 |
| 2,630,380 | 3/1953 | Hanson et al. | 252/393 |
| 3,294,501 | 12/1966 | Kawahara | 252/393 |
| 3,413,237 | 11/1968 | Foroulis | 252/393 |
| 3,728,281 | 4/1973 | Marks et al. | 252/392 |
| 3,808,138 | 4/1974 | Yamguchi et al. | 210/63 R |
| 3,843,547 | 10/1974 | Kaufman | 252/392 |
| 3,983,048 | 9/1976 | Schiessl et al. | 21/2.7 R |
| 4,026,664 | 5/1977 | Noack | 21/2.7 R |

*Primary Examiner*—Charles N. Hart
*Assistant Examiner*—Peter A. Hruskoci
*Attorney, Agent, or Firm*—Beveridge, DeGrandi, Kline & Lunsford

[57] ABSTRACT

A process is disclosed for eliminating oxygen dissolved in water wherein there is added to the water a hydrazine solution containing, as the activator, an amount of a compound of the formula:

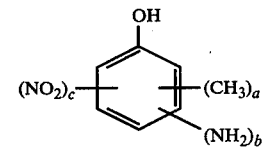

wherein $a = 0$, 1 or 2; $b = 0$, 1, 2 or 3; $c = 0$, 1, 2 or 3; $b + c = 2$ or 3; and $a + b + c = 3$, 4 or 5, sufficient to increase the rate or removal of such oxygen compared to the rate when an aqueous hydrazine solution, per se, is used.

The use of aqueous solutions of hydrazine to eliminate oxygen dissolved in water, such as boiler or heater water, is known.

7 Claims, No Drawings

PROCESS FOR THE SEQUESTRATION OF OXYGEN DISSOLVED IN WATER AND COMPOSITIONS USEFUL FOR SUCH PURPOSE

This is a continuation, of application Ser. No. 647,675, filed Jan. 9, 1976, now abandoned.

The present invention relates to an improved process for sequestering oxygen dissolved in water and further relates to new and novel compositions that can be used for this purpose.

It has now been found that compounds of the formula:

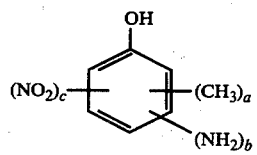

wherein $a = 0$, 1 or 2; $b = 0$, 1, 2 or 3; $c = 0$, 1, 2 or 3; $b + c = 2$ or 3; and $a + b + c = 3$, 4 or 5 which have been added to hydrazine solutions, give these solutions an ability to react with dissolved oxygen that is far superior to that of such hydrazine solutions when used alone.

The role of such compounds is merely to increase the reaction speed of the hydrazine with respect to such oxygen, and the amount of such compounds used is much less than the amount of oxygen to be eliminated and, also, much less than the amount of hydrazine employed.

To prepare the solutions of hydrazine activated according to the invention, a compound of Formula I is dissolved in an aqueous solution of hydrazine of various concentrations.

Generally 24% hydrazine monohydrate solutions, corresponding to 15% pure hydrazine, and also 36% monohydrate solutions, representing 23% pure hydrazine, are preferred. These solutions are usually used in the present treatment of boiler waters.

The amount of activator of Formula I to be placed in the hydrazine solutions is such that the weight ratio between this compound and hydrazine is between 1/1000 and 1/10, and preferably, between 1/300 and 1/30.

The hydrazine solutions thus activated with the compound of Formula I are particularly effective in rapidly eliminating oxygen from boiler waters. The amount of activated solution to be used is such that the weight ratio between the hydrazine and oxygen dissolved in the water is between 1 and 100, preferably between 1 and 15. A higher ratio offers no advantage for the rapidity of the reaction.

A preferred embodiment of the process for preparing activated hydrazine solutions according to the invention consists in using compounds carrying from one to three nitro groups. The property of hydrazine is utilized to reduce the nitro groups, to form in situ in the hydrazine solution amino compounds, such as amino cresols and triamino phenols, which are very difficult to isolate. The effectiveness of the activated solution is completely achieved when all of the nitro groups have been reduced to the corresponding amino group.

The following examples, in which the indicated parts are to be understood to be by weight, illustrate the invention without limiting it in any manner.

EXAMPLE 1

1.98 part of 4,6-dinitro 2-methyl phenol is added to 1000 parts of an aqueous hydrazine solution containing 112 parts hydrazine and this solution is then brought to boiling with reflux.

2 parts of this solution are added, after cooling, into 500 parts of water which has been saturated with air at atmospheric pressure and which contains approximately 9 mg/l of oxygen. The reduction of the concentration of oxygen in the air-saturated water is subsequently noted by means of an oxygen meter. This operation is repeated until two successive samples give the same result, which indicates that no more nitro group remains in the phenol activator. The reduction is then complete and the solution is now ready to be used as a sequestrant of oxygen dissolved in water.

The table below gives a comparison between the oxygen removing action of the above hydrazine solution to which dinitro cresol (A) has been added and that of the hydrazine solution without dinitro cresol (B). The water containing the dissolved oxygen is at a temperature of 20° C.

| Hydrazine with activator (Solution A) | | Hydrazine without activator (Solution B) | |
|---|---|---|---|
| Time in minutes | % of $O_2$ saturation | mg/l $O_2$ | % of $O_2$ saturation | mg/l $O_2$ |
| 0 | 100 | 9 | 100 | 9 |
| 0.30 | 70 | 6.3 | | |
| 1 | 22 | 1.98 | | |
| 2 | 3 | 0.27 | 99 | 8.92 |
| 2.30 | 2.5 | 0.22 | | |
| 3 | 2 | 0.18 | | |
| 5 | 1 | 0.09 | 98 | 8.82 |

EXAMPLE 2

Into 1000 parts of aqueous hydrazine solution containing 22.5% by weight of hydrazine are added 1.40 parts of 4,6-diamino 2-methyl phenol and the mixture is stirred until the phenol is dissolved.

Two parts of this solution are then introduced into 1000 parts of water saturated with air at atmospheric pressure at 40° C., and such water contains about 9 mg/l of oxygen. The reduction in the amount of oxygen dissolved in the water is subsequently noted with the aid of an oxygen meter.

The table below compares the oxygen removing function of the hydrazine solution to which diamino cresol (A) has been added with that of the hydrazine solution without diamine cresol (B).

After 5 minutes, the dissolved oxygen content in the water is no more than 0.195 mg/l when the composition according to the invention is used, i.e., 97% of the dissolved oxygen has disappeared. Under the same conditions, the oxygen content in the water at the end of 5 minutes is still 96% of the initial content, when hydrazine is used without activator, i.e., without the diamino cresol.

| Hydrazine with activator (Solution A) | | Hydrazine without activator (Solution B) | |
|---|---|---|---|
| Time in minutes | % of $O_2$ saturation | mg/l $O_2$ | % of $O_2$ saturation | mg/l $O_2$ |
| 0 | 100 | 6.50 | 100 | 6.50 |
| 1 | 26 | 1.69 | 99 | 6.44 |
| 2 | 8 | 0.52 | 98 | 6.36 |
| 3 | 4.5 | 0.29 | | |
| 4 | 3.5 | 0.28 | | |

| Hydrazine with activator (Solution A) | | | Hydrazine without activator (Solution B) | |
|---|---|---|---|---|
| Time in minutes | % of $O_2$ saturation | mg/l $O_2$ | % of $O_2$ saturation | mg/l $O_2$ |
| 5 | 3 | 0.195 | 96 | 6.24 |

EXAMPLE 3

Into a liter of aqueous 35% hydrazine monohydrate solution are added 2 parts of picramic acid (4,6-dinitro 2-amino phenol), and the mixture is heated at 90° C. for 20 hours.

The activity of this solution, with respect to the removal of dissolved oxygen, is noted as in the preceding example; i.e., two parts of the solution are added to 500 parts of water previously saturated with oxygen by bubbling of air therethrough at 20° C. under 760 mm of Hg. The percentage of oxygen remaining in the water is measured with an oxygen meter. No more than 2% of the initially dissolved oxygen, i.e., 0.18 g/liter, remains five minutes after the introduction of the solution of the invention therein.

Under the same conditions if 2 parts of the 35% hydrazine monohydrate solution without activator are added to the same amount of water, 98% of the initial amount of dissolved oxygen still remains at the end of five minutes. After an hour, the amount of dissolved oxygen is still equal to 90% of the initial amount.

It is within the scope of the invention to use, as starting materials, compounds of Formula I wherein the nitro group was substituted by a group which could be converted to the amino group when reduced by the hydrazine, such as the nitroso and nitramine groups. Such a compound would have the following Formula:

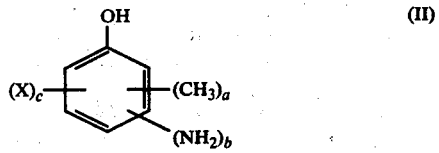
(II)

wherein X is a member selected from the group consisting of nitro, nitroso and nitramine; $a$ is 0, 1 or 2; $b$ is 0, 1, 2 or 3; $c$ is 0, 1, 2 or 3; $b + c$ is 2 or 3; and $a + b + c$ is 3, 4 or 5.

Whenever the group X is present in the compound and the group is reduced to the amino group by the hydrazine, then the compound which acts as the activator in the aqueous hydrazine solution has the following Formula:

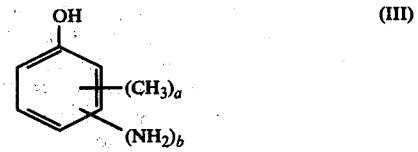
(III)

wherein $a$ is 0, 1 or 2; $b$ is 2, 3, 4 or 5 and $a + b$ is 3, 4 or 5.

Having described the invention, what is claimed is:

1. In the process of removing oxygen dissolved in water which comprises placing an aqueous hydrazine solution into contact with said water for a period of time sufficient to remove said dissolved oxygen, the improvement whereby said oxygen is more rapidly removed consisting essentially of adding to said hydrazine solution an amount of a compound of the formula:

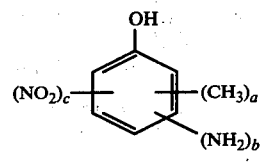

wherein $a = 0$, 1 or 2; $b = 0$, 1, 2 or 3; $c = 1$, 2 or 3; $b + c = 2$ or 3; and $a + b + c = 3$, 4 or 5, sufficient to increase the rate of removal of said dissolved oxygen from said water.

2. The process as defined in claim 1 wherein the weight ratio between said compound and the hydrazine in said hydrazine solution is between 1/1000 and 1/10.

3. The process as defined in claim 2 wherein the weight ratio between said compound and the hydrazine in said hydrazine solution is between 1/300 and 1/30.

4. The process as defined in claim 2 wherein the amount of activated hydrazine solution is such that the weight ratio between said hydrazine and said oxygen dissolved in water is between 1 and 100.

5. The process as defined in claim 4 wherein the amount of activated hydrazine solution is such that the weight ratio between said hydrazine and said oxygen dissolved in water is between 1 and 15.

6. In the process of removing oxygen dissolved in water which comprises placing an aqueous hydrazine solution into contact with said water for a period of time sufficient to remove said dissolved oxygen, the improvement whereby said oxygen is more rapidly removed from said water, consisting essentially of adding to said hydrazine solution a compound of the formula:

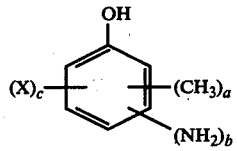

wherein X is a member selected from the group consisting of nitro, nitroso and nitramine, $a$ is 0, 1 or 2; $b$ is 0, 1, 2 or 3; $c$ is 1, 2 or 3; $b + c$ is 2 or 3 and $a + b + c$ is 3, 4 or 5, and maintaining said compound in said hydrazine solution until the group X is converted to the $NH_2$ group, said compound being present in an amount sufficient to increase the rate of removal of said dissolved oxygen from said water.

7. An aqueous hydrazine solution containing therein an amount of a compound of the formula:

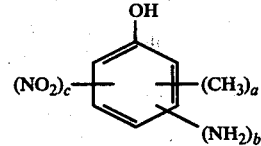

wherein $a = 0$, 1 or 2; $b = 0$, 1, 2 or 3; $c = 1$, 2 or 3; $b + c = 2$ or 3; and $a + b + c = 3$, 4 or 5, sufficient to increase the rate of removal of dissolved oxygen in water when said solution is

* * * * *